United States Patent
Badawy et al.

(10) Patent No.: US 9,508,052 B1
(45) Date of Patent: Nov. 29, 2016

(54) GENERATING CLIENT APPLICATIONS FOR BUSINESS PROCESSES MANAGEMENT ENGINES

(71) Applicant: International Business Machines Corporation, Armonk, NY (US)

(72) Inventors: Hossam M. M. Badawy, Cairo (EG); Ahmed El-Nakhily, Cairo (EG); Amr F. Yassin, Cairo (EG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/961,948

(22) Filed: Dec. 8, 2015

(51) Int. Cl.
*G06F 9/44* (2006.01)
*G06Q 10/06* (2012.01)
*G06Q 10/10* (2012.01)

(52) U.S. Cl.
CPC .......... *G06Q 10/067* (2013.01); *G06Q 10/103* (2013.01)

(58) Field of Classification Search
USPC ......... 717/102, 106–110, 125–128, 140–141
See application file for complete search history.

(56) References Cited

U.S. PATENT DOCUMENTS

| | | | | |
|---|---|---|---|---|
| 7,293,254 B2 * | 11/2007 | Bloesch | ................ | G06F 9/4428 717/108 |
| 7,565,640 B2 * | 7/2009 | Shukla | ...................... | G06F 8/10 715/234 |
| 7,631,291 B2 * | 12/2009 | Shukla | ...................... | G06F 8/10 717/107 |
| 7,784,025 B2 * | 8/2010 | Challapalli | ............ | G06Q 10/10 717/104 |
| 7,882,489 B2 * | 2/2011 | Chandrasekharan | ..... | G06F 8/30 717/106 |
| 7,895,563 B2 * | 2/2011 | Carlson | ..................... | G06F 8/36 717/102 |
| 8,001,521 B2 * | 8/2011 | Aakolk | .................. | G06Q 10/10 717/106 |
| 8,037,453 B1 * | 10/2011 | Zawadzki | ................. | G06F 8/71 717/107 |
| 8,042,092 B2 * | 10/2011 | Koehler | .................... | G06F 8/10 717/105 |
| 8,484,616 B1 * | 7/2013 | McCann | ................... | G06F 8/30 717/106 |
| 8,504,990 B2 * | 8/2013 | Klein | .................. | G06F 9/44505 707/781 |
| 8,522,194 B2 * | 8/2013 | Kaetker | ..................... | G06F 8/10 717/104 |
| 8,607,190 B2 * | 12/2013 | Coldicott | .................. | G06F 8/10 707/793 |
| 8,612,931 B2 * | 12/2013 | Bhandar | ................... | G06F 8/10 717/106 |
| 8,635,094 B2 | 1/2014 | Hubbard et al. | | |
| 8,671,396 B2 * | 3/2014 | Wu | ........................... | G06F 8/75 717/124 |
| 8,725,654 B2 | 5/2014 | Richter et al. | | |
| 8,930,831 B2 | 1/2015 | Bartomeli et al. | | |

OTHER PUBLICATIONS

List et al, "An Evaluation of Conceptual Business Process Modelling Languages", ACM, pp. 1532-1539, 2006.*
Cappelli et al, "An Aspect-Oriented Approach to Business Process Modeling", ACM, pp. 7-11 2009.*

(Continued)

*Primary Examiner* — Anil Khatri
(74) *Attorney, Agent, or Firm* — Cantor Colburn LLP; Scott Dobson

(57) ABSTRACT

Aspects include a computer-implemented method of generating client applications for a set of business processes management engines. A set of model definition files representing business process models is obtained, where each business process model describes the operation of a corresponding business processes management engine of the set of business processes management engines. A plurality of client applications are generated using the obtained model definition files. At least one client application of the plurality of client applications is arranged to communicate directly with two or more of the business processes management engines.

17 Claims, 7 Drawing Sheets

(56) References Cited

OTHER PUBLICATIONS

Kirk, "A Flexible Software Process Model", IEEE, pp. 1-3, 2004.*
List et al, "An Evaluation of Conceptual Business Process Modelling Languages", ACM, pp. 15-32-1539, 2006.*
Huang et al, "Automatically Exploiting Cross-Invocation Parallelism Using Runtime Information", IEEE, pp. 1-11, 2013.*
Chen et al, "Predictor: A Predictive Runtime Analysis Tool for Java", ACM, pp. 221-230, 2008.*
Nassar et al, "NUVA: Architectural Support for Runtime Verification of Parametric Specifications over Multicores", IEEE, pp. 137-146, 2015.*

* cited by examiner

GENERATING CLIENT APPLICATIONS FOR BUSINESS PROCESSES MANAGEMENT ENGINES

BACKGROUND

The present invention relates to generating client applications for business processes management (BPM) engines.

SUMMARY

Embodiments include methods, systems, and computer program products for generating client applications for a set of business processes management engines. A method includes obtaining a set of model definition files representing business process models, each business process model describing the operation of a corresponding business processes management engine of the set of business processes management engine. A plurality of client applications are generated using the obtained model definition files. At least one client application of the plurality of client applications is arranged to communicate directly with two or more of the business processes management engines.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
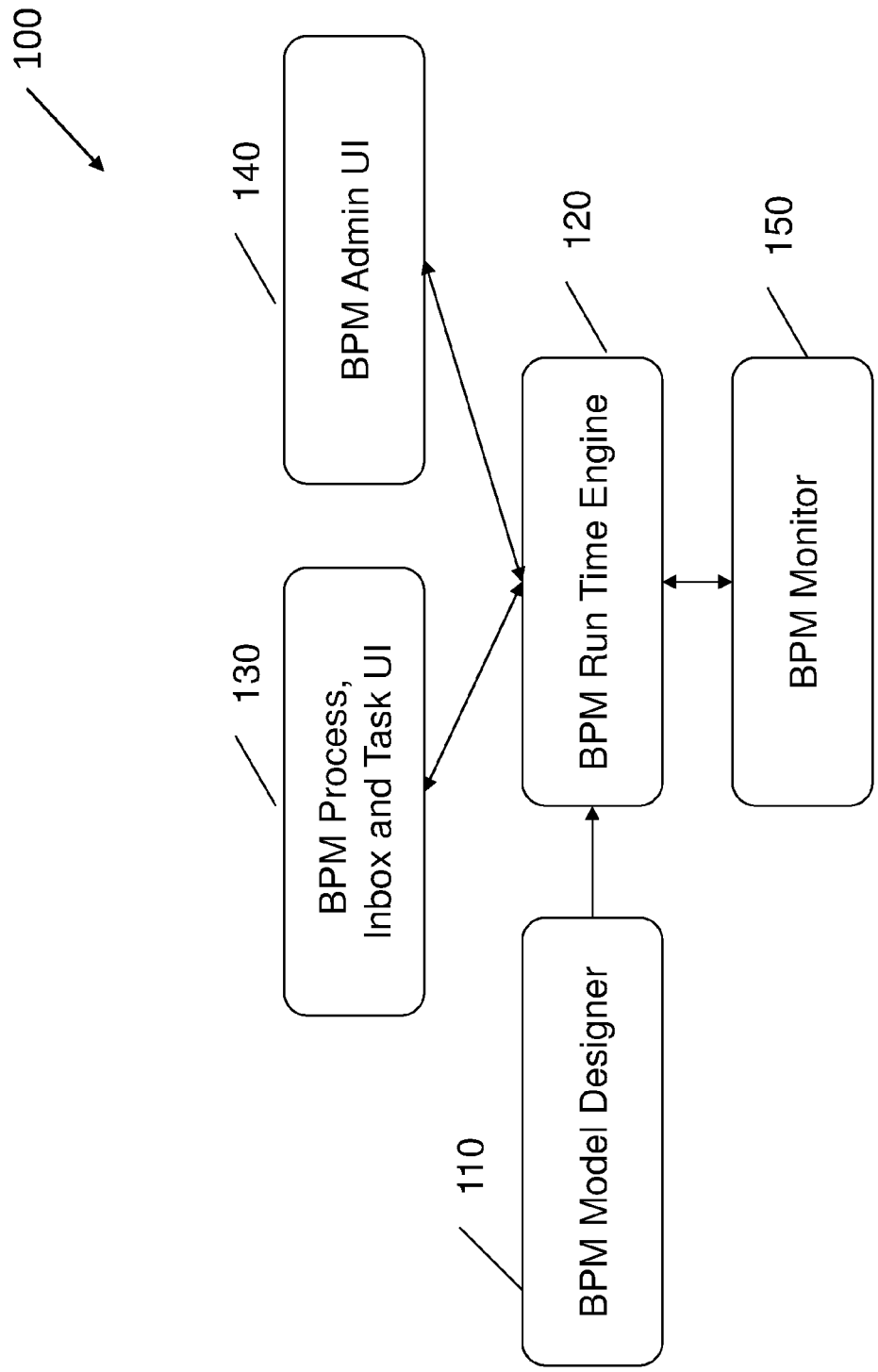
FIG. 1 is a schematic diagram of a business processes management (BPM) system for use with embodiments of the invention.

Business process management (BPM) systems are used by businesses to control and manage workflow. A BPM system 100 is shown in FIG. 1. The BPM system 100 comprises a BPM model designer 110, which is used at the BPM system design stage to generate models of the business processes that BPM systems, in particular the BPM system 100, implement. The BPM system 100 further comprises a BPM run time engine 120, which uses the model generated using the BPM model designer 110 to execute and maintain the process flow of the business process, identify tasks to be performed and that have been performed, and maintain the status of the business process.

The BPM system 100 also comprises a BPM process inbox and task user interface (UI) 130 that is a client application, i.e. an application that provides a user interface for a user to use to interact with the BPM system 100. The BPM process inbox and task UI 130 provides for the user an inbox that displays a list of user tasks, and a task UI that displays a user interface specific to a particular task being considered by the user, amongst other things. The BPM system 100 further comprises a BPM process administration UI 140, which displays required administrator tasks of the BPM system 100, and the business process it implements, to administrator-level users.

Finally, the BPM system 100 also comprises a BPM monitor 150, which monitors the execution of the processes and tasks and can be used to generate and displaying different reports and dashboards relating to the operation of the BPM system 100.

It will be appreciated that in other embodiments of the invention BPM systems with additional and/or alternative features may be used, for example which display BPM systems for which a differently configured client application with different functionality is provided for a user.

It is common for an overall business process to be separated into multiple interconnected business processes, each of which is implemented by a separate BPM system. For example, a "virtual" university may be provided by multiple conventional participating universities, each of which provides part of a coherent set of courses. The overall business process might be separated into an enrolment process implemented by one BPM system, course participation and exam processes implemented by different BPM systems by the different universities, and a central exam marking process implemented by a further BPM system. To give another example, a goods supplier might have an inventory management process, sales process, returns process, customer service process and the like, all implemented by different BPM systems.

As can be seen, in such cases the overall business process spans multiple interrelated business processes implemented by different BPM systems.

Figure 2:
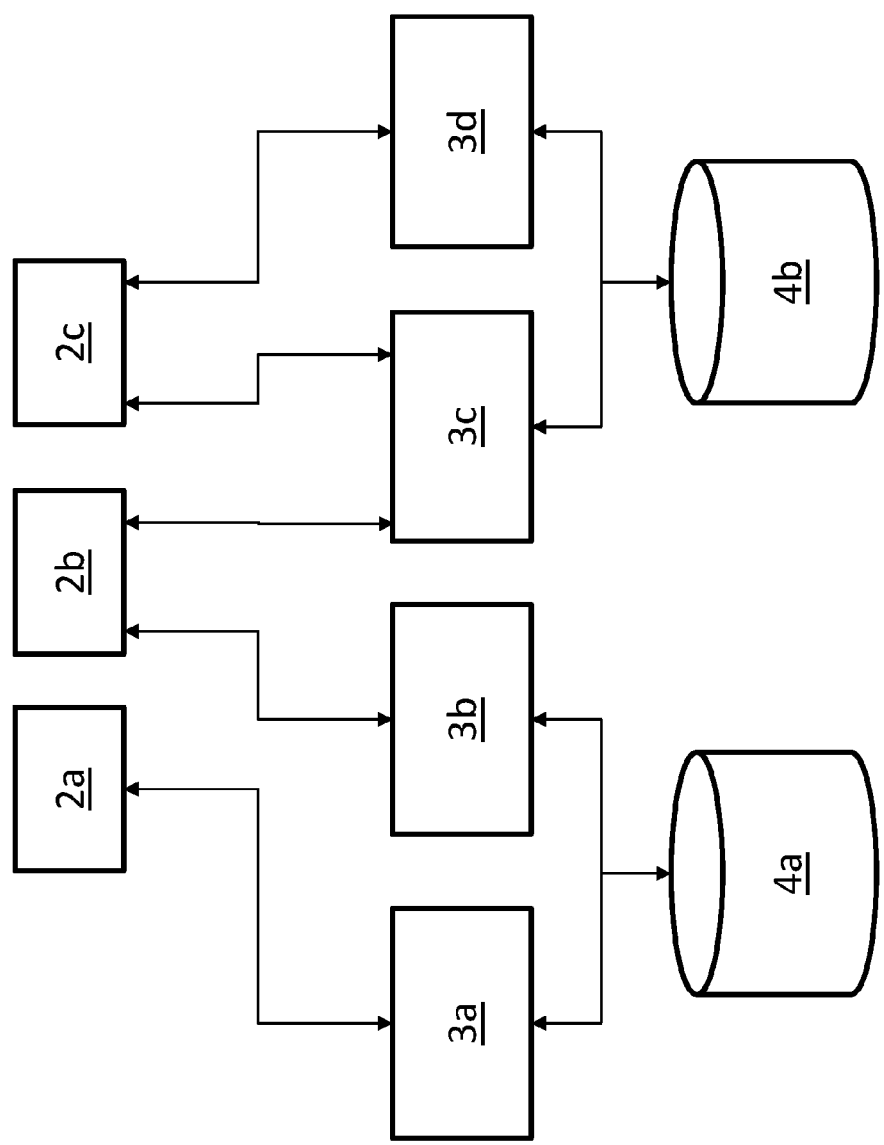
FIG. 2 is a schematic diagram of a computer system in accordance with an embodiment of the invention.

A computer system in accordance with an embodiment of the invention is now described with reference to FIG. 2. The computer system 1 comprises a plurality of client applications 2a, 2b and 2c, which each of which provides a BPM process inbox and task UI 130 to a user, as described in more detail below. BPM engines 3a, 3b, 3c and 3d are each a BPM run time engine 120, each implementing a different business process. BPM engine 3a is in communication with client application 2a, BPM engine 3b is in communication with client application 2b, BPM engine 3c is in communication with client applications 2b and 2c, and BPM engine 3d is in communication with client application 2c. Data stores 4a and 4b comprise data used by the BPM engines, with BPM engines 3a and 3b being in communication with data store 4a, and BPM engines 3c and 3d being in communication with data store 4b.

In the example of a goods supplier, the BPM engine 3a could handle the inventory management process, using inventory information stored in the data store 4a. A stock manager could use the client application 2a to ensure adequate inventory is maintained. The BPM engine 3b could then handle the sales process, again using inventory information stored in the data store 4a and also customer information stored in the data store 4b; and the BPM engine 3c could handle the returns process, using customer information stored in the data store 4b. A sales person could use the client application 2b to handle the sales process and returns process (via the BPM engines 3b and 3c respectively). The BPM engine 3b could handle the customer service process, again using the customer information stored in the data store 4b. A customer service representative could then use the client application 2c to handle the returns process and the customer service process (via the BPM engines 3c and 3d respectively).

Importantly, it will be appreciated that while the BPM engines 3a, 3b, 3c and 3d implement parts of the same overall business process, they are not in direct communication with each other, and indeed may use different communication protocols so be unable to do so.

It will also be appreciated that the client applications 2a, 2b and 2c may be configured to run on different computing platforms. For example, in the goods supplier example, the client application 2a might be configured to run on web browsers and smartphones/tablets, the client application 2b to run on a specific call centre computing platform, and the client application 2c on a conventional personal computer.

Figure 3:
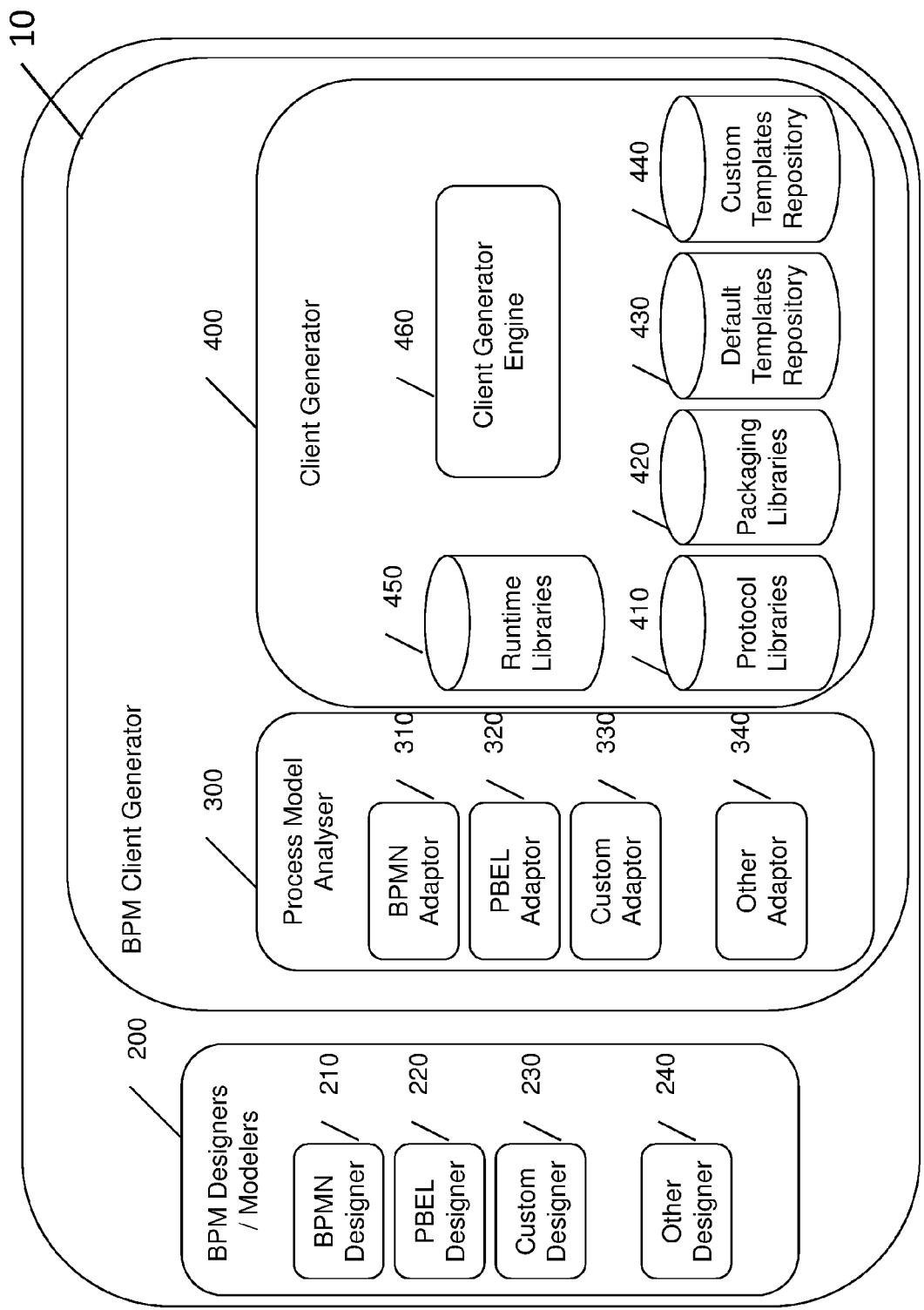
FIG. 3 is a schematic diagram of a BPM client generator in accordance with an embodiment of the invention.

A BPM client generator 10 in accordance with an embodiment of the invention is now described with reference to FIG. 3. As described in more detail below, the BPM client generator 10 enables heterogeneous client applications (i.e. client applications that are not all of the same type, e.g. are not all for connecting to the same BPM engines and/or are not all to be run on the same computing platform) to be automatically generated, for example the client applications 2a, 2b and 2c for the computer system 1.

A set of BPM designers/modellers 200 comprises the different tools used to generate a model of a business process implemented by a BPM system, in particular by the BPM engines 3a, 3b, 3c and 3d. The model is provided using a model definition file. The BPM designers/modellers 200 comprise a BPMN designer 210, which generates models of processes in the Business Process Model and Notation (BPMN) notation; a Business Process Execution Language (BPEL) designer 220, which generates models of processes in the BPEL notation; a custom designer 230, which generates models of processes in a custom notation, and an "other" designer 240, which may be any other designer that generates models of processes in another notation.

The BPM client generator 10 itself comprises a process model analyser 300. The process model analyser 300 comprises a BPMN adaptor 310, which transforms models represented using the BPMN notation into a common/universal format used by the BPM client generator 10; a PBEL adaptor 320 which transforms models represented using the BPEL notation into the common/universal format; a custom adaptor 330 which transforms models represented using the custom format of the custom designer 230 into the common/universal format, and an "other" adaptor 340, which transforms models represented using the format of the other designer 240 into the common/universal format.

Further, the BPM client generator 10 also comprises a client generator 400, which generates the code, scripts and deployable components of the client applications 2a, 2b and 2c, and contains several libraries that are used in the generation process. In particular, the client generator 400 comprises protocol libraries 410, which contains libraries allowing communication in accordance with different communication protocols, such as web service client libraries, RESTful interface libraries and the like; and packaging libraries 420, which contains the packaging libraries for different client platform targets, such as iOS, Android, J2EE and the like. The client generator 400 further comprises template repositories, in particular a default templates repository 430, which contains default user interface (UI) templates and other templates such as monitoring and administration templates and the like, that are used to generate the components needed for each task as described in more detail below; and a custom templates repository 440, which contains corresponding customized templates. Further again, the client generator 400 comprises runtime libraries 450, which contain code snippets for interacting with the APIs of BPM engines, to perform tasks such as Claim Task, Get Inbox, Login and the like. Finally, the client generator 400 comprises a client generator engine 460, which uses the libraries and repositories to generate the components required for the client applications, as described in more detail below.

It will be appreciated that in alternative embodiments, BPM client generators could be used which comprised different subcomponents, for example fewer or extra designers/modellers, adaptors, libraries and/or repositories, and that the exact set described above would not be required in all embodiments of the invention.

Figure 4:
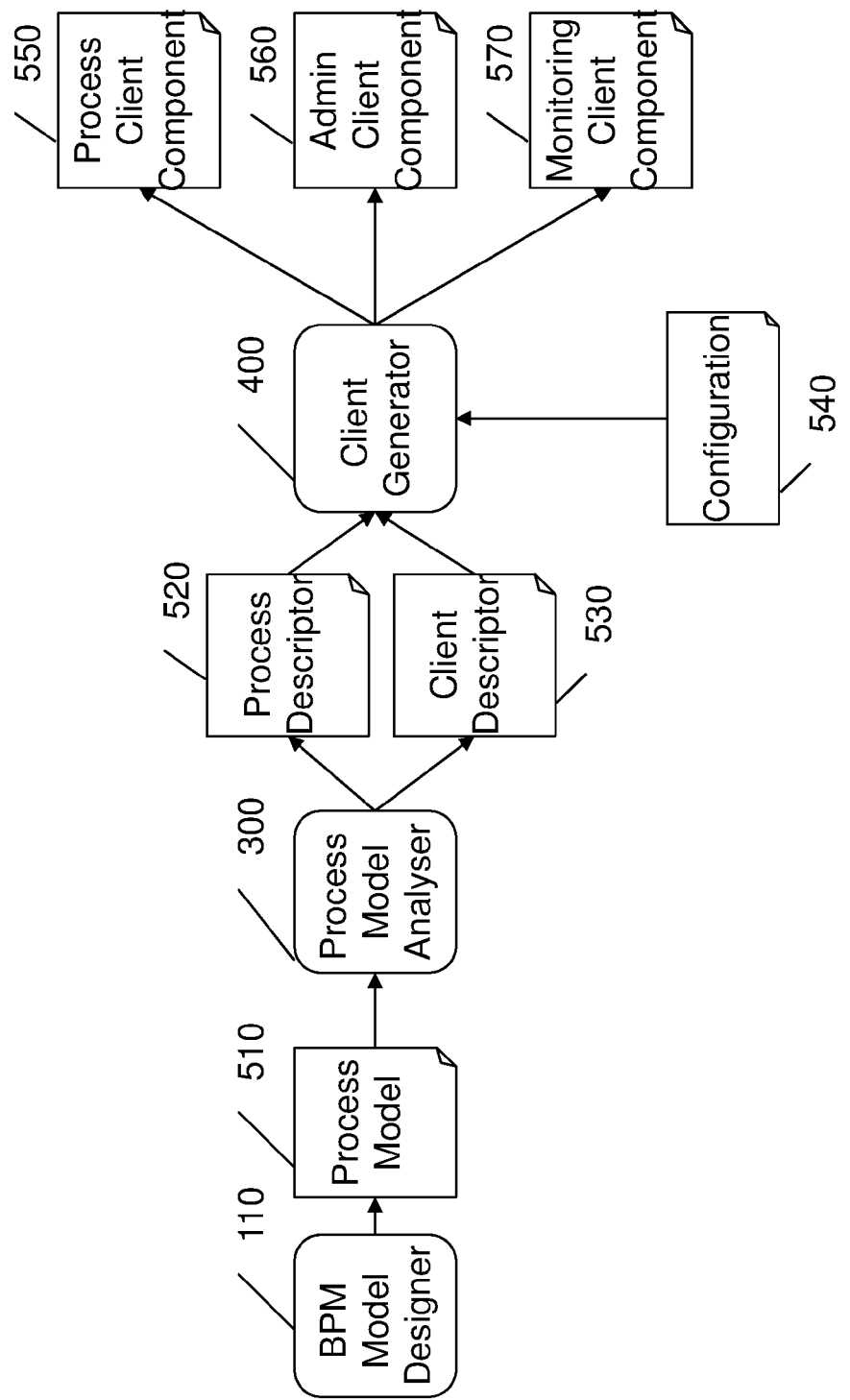
FIG. 4 is a data-flow chart showing the high-level operation of the BPM client generator of FIG. 3.

The high-level operation of the BPM client generator 10 is now described with reference to the data-flow chart of FIG. 4. When initially configuring the BPM engines 3a, 3b and 3c, a user will use the BPM model designer 110 to generate the process models 510 required, which as mentioned above are provided as model definition files. For each generated process model 510, the computer system 1 uses the process model analyser 300 to analyse the process model 510, after determining which adaptor 310, 320, 330, 340 to use to read the process model 510. The adaptor to use can be determined from the process model 510, which will also contain a description of which BPM engine to use for each task. The process model analyser 300 then generates a process descriptor 520, which contains a list of the process tasks and the input and output data structure of each task, and a client descriptor 530, which contains metadata to describe each client application, both in the common/universal format used by the client generator 400.

A user of the client generator 400 can if they wish modify the default configuration of the client generator 400, to tailor the components it generates. However, it will be appreciated that in alternative embodiments of the invention, only default configurations would be available, and no modification would be allowed.

The (default or modified) configuration 540 is provided as an input to the client generator 400, as a text file, XML, database, or in any other appropriate form. The configuration 540 contain generation parameters defining, for example: which client applications to generate for the different process components; which template to use for each inbox or task screen being generated; which protocol libraries and versions to use for each process component which runtime libraries and versions to use for the different client elements, in case the related BPM engine provides different sets of these libraries; and different packaging parameters for the different client components.

The client generator 400 then uses the generated process descriptor 520 and client descriptor 530, along with the configuration 540, to generate the following client application components: a process client component 550, which is a deployable client component for the process (or processes) containing the client application, including the inbox and task user interfaces; an admin client component 560, which is a deployable client component containing the different administration tasks for the process (or processes); and a monitoring client component 570, which is a deployable component containing the monitoring components and dashboards for the process (or processes).

The generated client application UIs can include, for example: an inbox view that shows the available process task instances for the current user role(s); screens for the different tasks, which present the task input data to the user, and using which the user can create/update and submit the task output data or actions; a general process administration screen; screens for specific task administration functions a general process monitor screen that contains default monitoring measures/metrics/KPIs; and screens for specific task monitoring metrics.

As mentioned above, the default templates repository 430 contains default user interface (UI) templates and other templates such as monitoring and administration templates and the like, that are can be used to generate default versions of the UI components listed above for the generated client application; and the custom templates repository 440 contains customised versions of the templates to allow the UI presentation of the client application to be customised.

Figure 5:
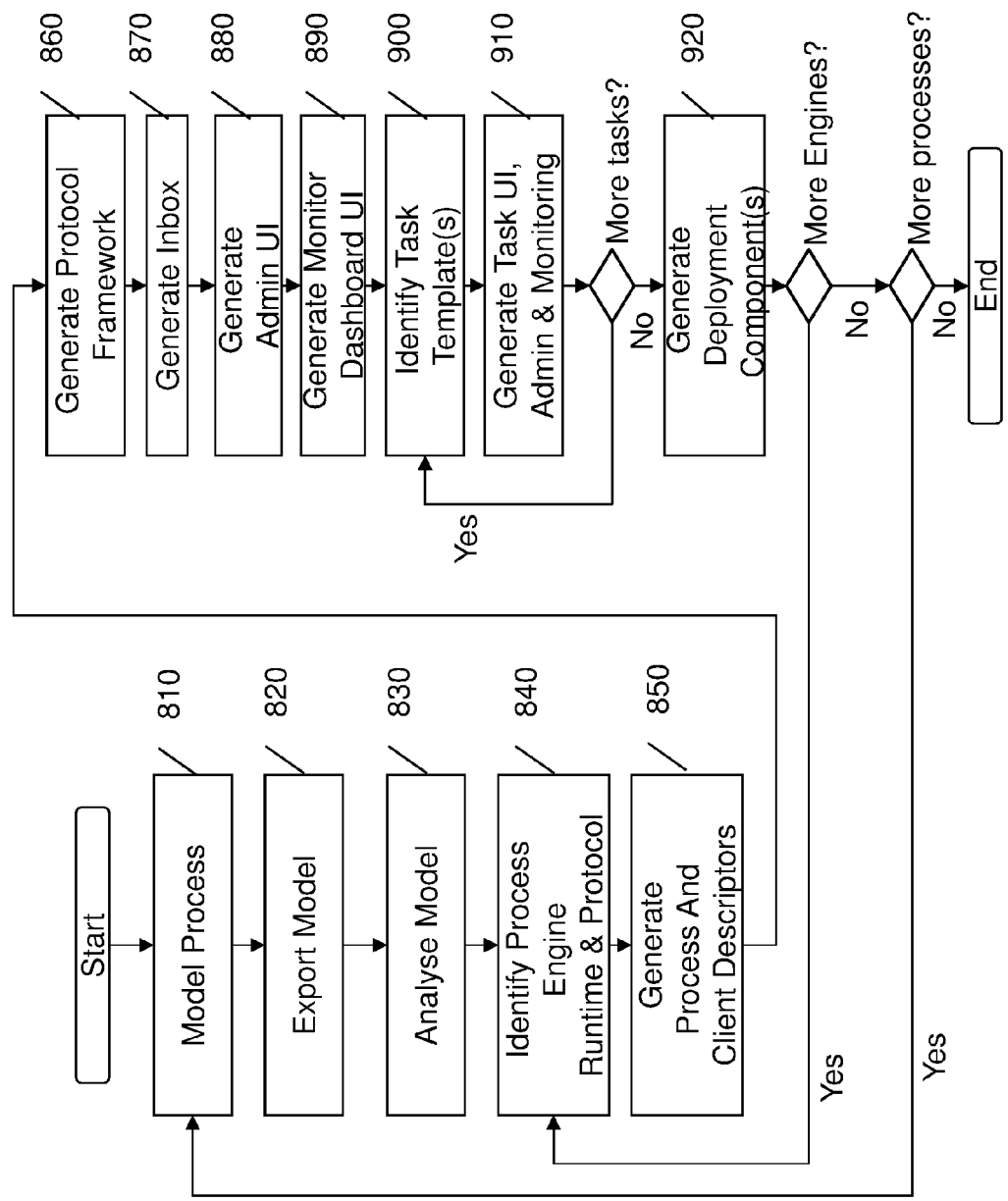
FIG. 5 is a flowchart showing in more detail the operation of the BPM client generator of FIG. 3.
Figure 6:
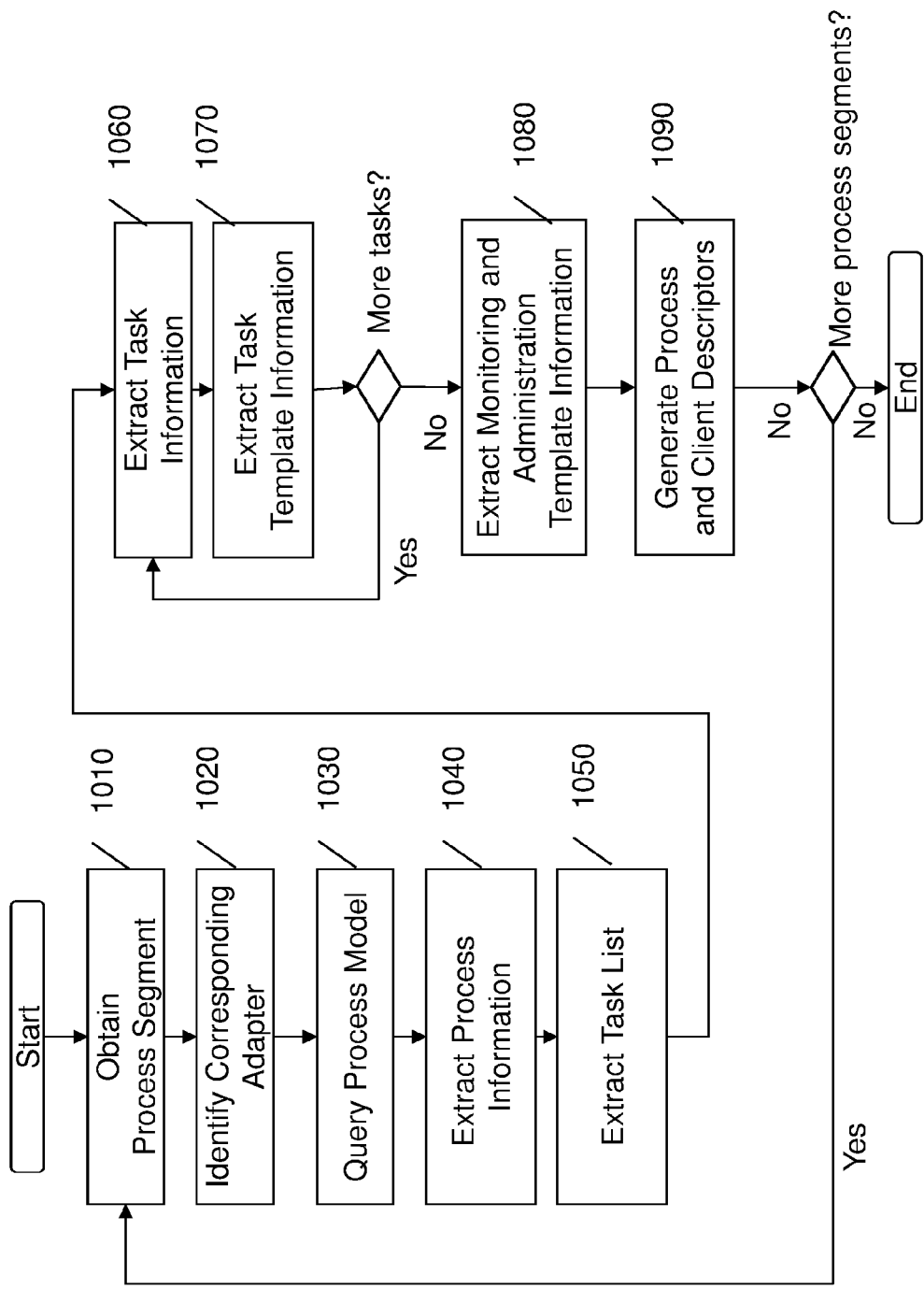
FIG. 6 is a flowchart showing in more detail the operation of the process model analyser of the BPM client generator of FIG. 3.

The operation of the BPM client generator 10 is now described in more detail with reference to the flowcharts of FIGS. 5 and 6. As can be seen in FIG. 5, initially a model of the business process is generated (block 810), using the BPM model designer 110. The generated model is exported from the BPM model designer 110 as a model definition file (block 820), for analysis by the process model analyser 300 (block 830). The process model analyser 300 identifies a required process engine runtime and protocol for the model (block 840), and generates a corresponding process descriptor 520 and client descriptor 530 (block 850). The client generator 400 then generates a protocol framework for the client application (block 860), along with the inbox (block 870), admin UI (block 880) and monitor dashboard UI (block 890) defined by the generated model.

Next, the client generator 400 identifies a task template defined by the generated model (block 900), and generates a corresponding task UI, admin and monitoring (block 910). This process is iterated until no further tasks remain.

Using the various generated components, the client generator 400 generates a deployable component for the business component (block 920).

The step of identifying a required BPM engine runtime and protocol for the model and subsequent steps (block 840 onwards) are iterated, until no BPM engines remain to be considered in the model being analysed. In addition, the entire process is iterated for each generated model, after which the process is complete.

The operation of the process model analyser 300 is now described in more detail with reference to the flowchart of FIG. 6. When analysing a model, initially a segment of the BPM process is obtained (block 1010), and the required adaptor is identified (block 1020). The model is queried (block 1030), to extract process information (e.g. Name, GUID, Input, Output etc.) (block 1040), the task list (block 1050), task information (e.g. Name, GUID, Input, Output etc.) (block 1060) and task template information (block 1070), with the last two blocks being iterated until the information and template information has been extracted for all tasks. Monitoring and administration template information is then extracted (block 1080), and the process descriptor 520 and client descriptor 530 are then generated using the extracted information (block 1090). The entire process is iterated until all segments of the BPM process have been obtained and the corresponding process descriptors 520 and client descriptors 530 generated.

Thus, it can be seen that the client applications can be automatically generated (with customisations if desired) using the templates of the client generator 400, by analysing the model definition files that were created during the BPM system design stage. As the client generator 400 is able to analyse multiple models used on multiple BPM engines, and can provide client application components for multiple computing platforms, multiple client application can be generated, and the client applications can interact with multiple BPM engines if required.

It will be appreciated that in some embodiments of the invention, new administration roles will need to be created (or existing administration roles modified) to allow administration and monitoring rights for multiple BPM engines, where a client application interacts with multiple BPM engines. This is because existing administration roles will only provide administration and monitoring rights for individual BPM engines.

Figure 7:
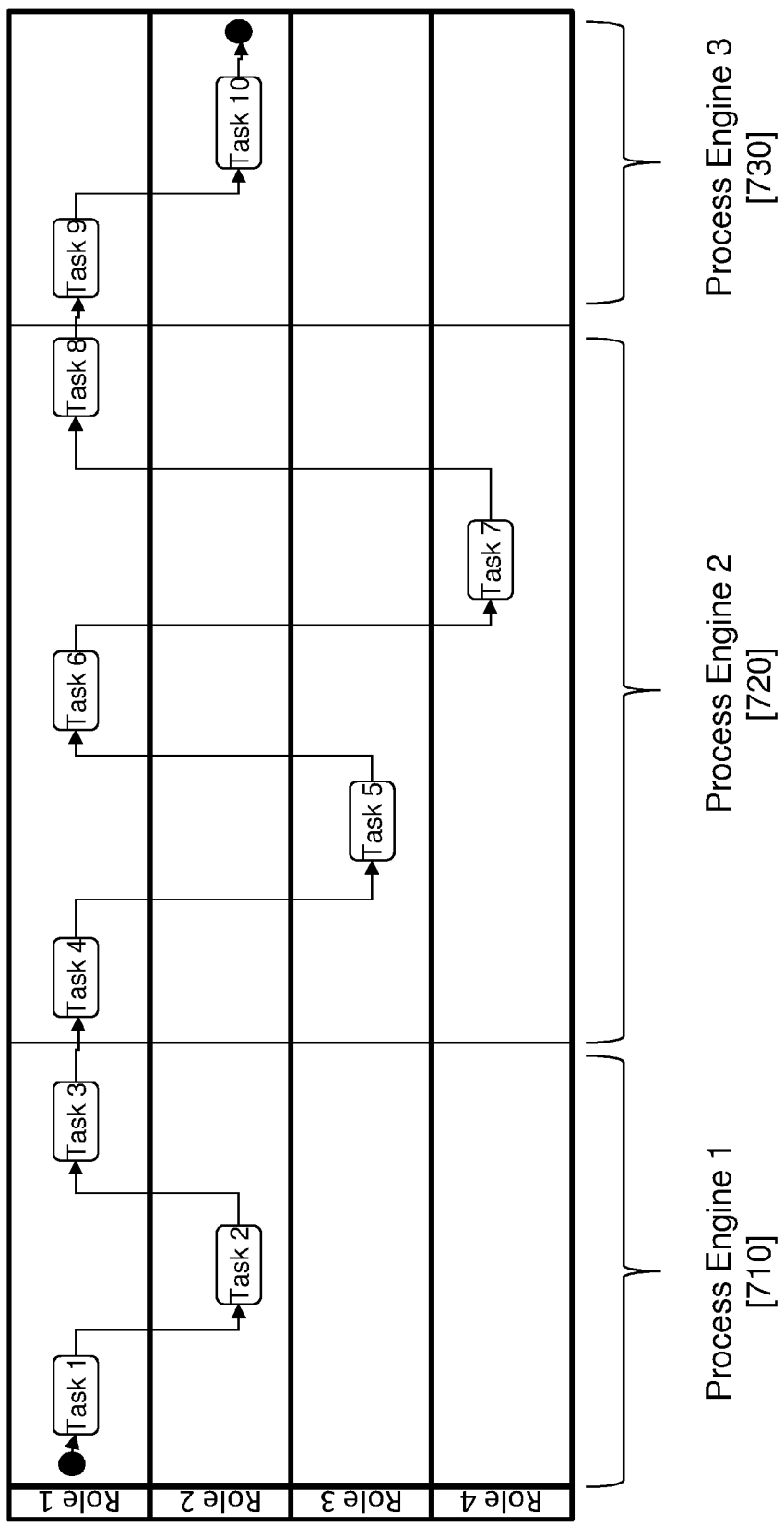
FIG. 7 is a chart showing an example of tasks being performed using client applications generated by an embodiment of the invention.

FIG. 7 is a chart showing an example of tasks being performed using client applications generated by the embodiment of the invention. Task 1, Task 2 and Task 3 are run by a first BPM engine 710, but with Task 1 and Task 3 being performed by a first user under Role 1 using a first client application, and Task 2 being performed by a second user under Role 2 using a second client application. Task 4, Task 5, Task 6, Task 7 and Task 8 are run by a second BPM engine 720, with Task 4, Task 6 and Task 8 being performed by the first user under Role 1 using the first client application, Task 5 being performed by a third user under Role 3 using a third client application, and Task 7 being performed by a fourth user under Role 4 using a fourth client application. Task 9 and Task 10 are run by a third BPM engine 730, with Task 9 being performed by the first user under Role 1 using the first client application, and Task 10 being performed by the second user under Role 2 using a second client application. While the users are performing tasks that are run by different underlying BPM engines, they each use a single client application comprised of components generated by the Clients Generator 400, with customised Inbox and the tasks UI communicate with the required BPM engine while presenting a unified UI to the user.

While the present invention has been described and illustrated with reference to particular embodiments, it will be appreciated by those of ordinary skill in the art that the invention lends itself to many different variations not specifically illustrated herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method of generating client applications for a set of business processes management runtime engines, the method comprising:
    obtaining a set of model definition files representing business process models, each business process model describing the operation of a corresponding business processes management runtime engine of the set of business processes management runtime engines, the obtained set of model definition files in a plurality of different formats;
    transforming, by a process model analyzer executing on a computer, each of the model definition files in the set into process and client descriptors, the process and client descriptors in a common format, the process descriptors each comprising a list of process tasks, and input and output data structures for each task, and the client descriptors comprising metadata describing the client applications; and
    generating, by a client generator executing on a computer, a plurality of client applications based on the processor descriptors, the client descriptors, and client application generation parameter, each client application comprising a process client component, an administration client component, and a monitoring client component,
    wherein at least one client application of the plurality of client applications is arranged to communicate directly with two or more of the business processes management runtime engines; and
    wherein the transforming utilizes a plurality of business process model adaptors, each business process model adaptor being arranged to read a model definition file of a different format.

2. A computer-implemented method as claimed in claim 1, wherein at least two client applications of the plurality of client applications are arranged to be run on different computing platforms.

3. A computer-implemented method as claimed in claim 1, wherein each process definition file of the set of process definition files is obtained from the business processes management runtime engine corresponding to the process definition file.

4. A computer-implemented method as claimed in claim 1, wherein at least one client application of the plurality of client applications is arranged to communicate with two or more of the business process runtime management engines using different communication protocols.

5. A computer-implemented method as claimed in claim 1, wherein the plurality of client applications are generated using a repository of user interface templates.

6. A computer-implemented method as claimed in claim 4, further comprising customizing a template from the repository of user interface templates.

7. A computer-implemented method as claimed in claim 1, wherein the each of the plurality of client applications provides at least a task inbox and a task user interface to a user.

8. A client generator computer system for generating client applications for a set of business processes management runtime engines, the system comprising:
    a memory having computer readable instructions; and
    one or more processors for executing the computer readable instructions, the computer readable instructions comprising:
    obtaining a set of model definition files representing business process models, each business process model describing the operation of a corresponding business processes management runtime engine of the set of business processes management runtime engines, the obtained set of model definition files in a plurality of different formats;
    transforming, by a process model analyzer, each of the model definition files in the set into process and client descriptors, the process and client descriptors in a common format, the process descriptors each comprising a list of process tasks, and input and output data structures for each task, and the client descriptors comprising metadata describing the client applications; and
    generating, by a client generator, a plurality of client applications based on the processor descriptors, the client descriptors, and client application generation parameters, each client application comprising a process client component, an administration client component, and a monitoring client component a plurality of client applications using the obtained model definition files,
    wherein at least one client application of the plurality of client applications is arranged to communicate directly with two or more of the business processes management runtime engines; and
    wherein the transforming utilizes a plurality of business process model adaptors, each business process model adaptor being arranged to read a model definition file of a different format.

9. A client generator computer system as claimed in claim 8, wherein at least two client applications of the plurality of client applications are arranged to be run on different computing platforms.

10. A client generator computer system as claimed in claim 8, wherein each process definition file of the set of process definition files is obtained from the business processes management runtime engine corresponding to the process definition file.

11. A client generator computer system as claimed in claim 8, wherein at least one client application of the plurality of client applications is arranged to communicate with two or more of the business process management runtime engines using different communication protocols.

12. A client generator computer system as claimed in claim 8, arranged to generate the plurality of client applications using a repository of user interface templates.

13. A client generator computer system as claimed in claim 12, arranged to allow a user to customize a template from the repository of user interface templates.

14. A client generator computer system as claimed in claim 8, wherein the each of the plurality of client applications provides at least a task inbox and a task user interface to a user.

15. A computer program product for generating client applications for a set of business processes management engines, the computer program product comprising—a non-transitory computer-readable storage medium having program instructions embodied therewith, the program instructions executable by a processor to cause the processor to perform:

obtaining a set of model definition files representing business process models, each business process model describing the operation of a corresponding business processes management runtime engine of the set of business processes management runtime engines, the obtained set of model definition files in a plurality of different formats;

transforming, by a process model analyzer, each of the model definition files in the set into process and client descriptors, the process and client descriptors in a common format, the process descriptors each comprising a list of process tasks, and input and output data structures for each task, and the client descriptors comprising metadata describing the client applications; and generating, by a client generator, a plurality of client applications based on the processor descriptors, the client descriptors, and client application generation parameters, each client application comprising a process client component, an administration client component, and a monitoring client component a plurality of client applications using the obtained model definition files;

wherein at least one client application of the plurality of client applications is arranged to communicate directly with two or more of the business processes management runtime engines; and wherein each process definition file of the set of process definition files is obtained from the business processes management runtime engine corresponding to the process definition file.

16. A computer program product as claimed in claim 15, wherein at least two client applications of the plurality of client applications are arranged to be run on different computing platforms.

17. A computer program product as claimed in claim 15, wherein at least one client application of the plurality of client applications is arranged to communicate with two or more of the business process management runtime engines using different communication protocols.

* * * * *